(12) United States Patent
Huang

(10) Patent No.: US 8,896,157 B2
(45) Date of Patent: Nov. 25, 2014

(54) POWER SUPPLY AND POWER SUPPLYING SYSTEM WITH REMOTE POWER MANAGEMENT FUNCTION

(75) Inventor: Yu-Hung Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 776 days.

(21) Appl. No.: 12/951,322

(22) Filed: Nov. 22, 2010

(65) Prior Publication Data

US 2011/0121662 A1    May 26, 2011

Related U.S. Application Data

(63) Continuation-in-part of application No. 12/713,764, filed on Feb. 26, 2010, now Pat. No. 8,441,151.

(60) Provisional application No. 61/266,627, filed on Dec. 4, 2009, provisional application No. 61/263,895, filed on Nov. 24, 2009.

(30) Foreign Application Priority Data

Sep. 10, 2010    (TW) .................................. 99130790

(51) Int. Cl.
| | | |
|---|---|---|
| *H01H 31/34* | (2006.01) | |
| *H02J 7/22* | (2006.01) | |
| *H02H 9/00* | (2006.01) | |
| *H02H 3/00* | (2006.01) | |

(52) U.S. Cl.
CPC *H02H 9/004* (2013.01); *H02H 3/00* (2013.01)
USPC ........ 307/97; 307/2; 307/17; 307/39; 307/44; 307/11; 439/66; 439/65; 363/84; 361/90

(58) Field of Classification Search
USPC .......................... 307/97, 2, 11; 363/84; 361/90
See application file for complete search history.

(56) References Cited

U.S. PATENT DOCUMENTS

| 4,034,172 A | 7/1977 | Glover et al. |
| 6,030,233 A * | 2/2000 | Kamiyamane .................. 439/65 |

(Continued)

FOREIGN PATENT DOCUMENTS

| CN | 101034778 | 9/2007 |
| JP | 09/046564 | 2/1997 |

(Continued)

*Primary Examiner* — Rexford Barnie
*Assistant Examiner* — Jagdeep Dhillon
(74) *Attorney, Agent, or Firm* — Kirton McConkie; Evan R. Witt

(57) ABSTRACT

The power supply includes a first power connector, a power conversion circuit, a control unit and a detection circuit. The first power connector includes a plurality of power terminals and a first detecting terminal. The power conversion circuit is coupled to the power terminals of the first power connector for converting an input voltage into an output voltage. The control unit is coupled to the power conversion circuit for controlling an operation of the power conversion circuit. The detection circuit is coupled to the control unit and the first detecting terminal of the first power connector for detecting if the first detecting terminal is connected or disconnected with a predetermined voltage terminal and correspondingly generating a power transmission status signal to the control unit. When the detection circuit detects the first detecting terminal is disconnected with the predetermined voltage terminal, the power transmission status signal is under a disabled status and the control unit controls the power conversion circuit not to generate or output the output voltage to the load according to the power transmission status signal.

20 Claims, 9 Drawing Sheets

1

(56) References Cited

U.S. PATENT DOCUMENTS

| | | |
|---|---|---|
| 6,494,743 B1 | 12/2002 | Lamatsch et al. |
| 2004/0160716 A1* | 8/2004 | Miura .............................. 361/90 |
| 2008/0309160 A1* | 12/2008 | Gibson et al. ................... 307/11 |
| 2009/0091182 A1* | 4/2009 | Tamada et al. .................... 307/2 |
| 2009/0206792 A1 | 8/2009 | Hyatt |
| 2010/0091531 A1* | 4/2010 | Lum ............................... 363/84 |

FOREIGN PATENT DOCUMENTS

| | | |
|---|---|---|
| JP | 2006353016 | 12/2006 |
| JP | 2008/065364 | 3/2008 |
| TW | M265785 | 5/2005 |

* cited by examiner

POWER SUPPLY AND POWER SUPPLYING SYSTEM WITH REMOTE POWER MANAGEMENT FUNCTION

CROSS-REFERENCE TO RELATED APPLICATIONS

This application claims the benefit of prior U.S. provisional application 61/263,895, which is entitled "INTELLIGENT POWER CONNECTOR ASSEMBLY CAPABLE OF PREVENTING GENERATION OF ARC FLASH" and filed Nov. 24, 2009, and claims the benefit of prior U.S. provisional application 61/266,627, which is entitled "ARC FLASH PROTECTION MECHANISM FOR POWER SUPPLY AND DATA-PROCESSING SYSTEM EMPLOYING SAME" and filed Dec. 4, 2009. This application is a continuation-in-part of U.S. patent application Ser. No. 12/713,764 filed on Feb. 26, 2010, and entitled "POWER SUPPLY WITH ARC FLASH PROTECTION MECHANISM AND DATA-PROCESSING SYSTEM EMPLOYING SAME". The entire disclosures of the above applications are all incorporated herein by reference.

FIELD OF THE INVENTION

The present invention relates to a power supply and a power supplying system, and more particularly to a power supply and a power supplying system with remote power management function used for a data-processing system.

BACKGROUND OF THE INVENTION

With increasing industrial development, diverse electronic equipments are used to achieve various purposes. An electronic equipment comprises a plurality of electronic components. Generally, different kinds of electronic components are operated by using different voltages.

As known, a power supply is essential for many electronic equipments such as personal computers, industrial computers, servers, communication products or network products. Usually, the user may couple a socket of a power supply to a plug of a power cord (i.e. external power source) so as to receive an AC voltage input or DC voltage input. The power supply will convert the input power into a desired output power for powering the electronic equipment.

For general power conversion systems, power distribution systems, power supplying systems and electronic equipments, an instant spark may be generated at the switch contacts due to the electric current flowing therethrough, and the electric arc between the two contacts will melt the switch contacts, which causes damages to the electronic equipment. Moreover, in the power supply, when the input plug of an external power source is contacted with or pulled out from the socket of the power supply, an electric arc may also be resulted and the electronic equipment is accordingly damaged.

Currently, different kinds of electromagnetic arc-suppressing devices, heat-operated arc-suppressing devices or air circuit breakers are used to suppress arc generation. Alternatively, the contacts are covered by current-withstanding alloy and insulating material to prevent damages to the contacts and damages to human bodies. However, these solutions require a certain space and high cost, and are not suitable to be used for the power supply with high power density.

In addition, power supplies are important elements for providing desired power to the electronic equipments of a data-processing system, for example servers of a data center. In order to prevent the damages to the system due to the unintentional or accidental interruption of power, a power cord latching or retaining structure is employed to anchor the power cord on the power supply so as to prevent the plug of the power cord from loosening and dropping from the socket of the power supply and prevent the generation of arc flash due to high electric current flowing through the contacts of the connectors. However, it is still an unsafe protection mechanism to prevent the system from shutting down or damages due to arc flash and unintentional or accidental interruption of power.

Besides, in current data-processing systems, the power management of the power supplying system is carried out by connecting the output plug of the power supply to the server in the data-processing system such that the power can be managed and distributed by the server. However, this method of power management is laboring and inconvenient, and cannot achieve the best power management and distribution, and power protection as well.

To overcome the disadvantages of the prior art described above, there is a need to provide a power supply and a power supplying system used for a data-processing system and having remote power management and power protection function, so as to conform the current demand.

SUMMARY OF THE INVENTION

It is an object of the present invention to provide a power supply and a power supplying system used for a data-processing system, wherein the power supply and the power supplying system have remote power management and distribution function, so as to achieve the best power management and distribution.

Another object of the present invention provides a power supply and a power supplying system used for a data-processing system, wherein the power supply and the power supplying system have power protection mechanism and remote power management function, so as to prevent the generation of arc flash due to high electric current flowing through the contacts of the connectors and avoid damages to the power supply or the data-processing equipments due to the electric arc and unintentional or accidental interruption of power-supplying.

In accordance with an aspect of the present invention, there is provided a power supply including a first power connector, a power conversion circuit, a control unit and a detection circuit. The first power connector includes a plurality of power terminals and a first detecting terminal. The power conversion circuit is coupled to the power terminals of the first power connector for receiving an input voltage and converting the input voltage into an output voltage. The control unit is coupled to the power conversion circuit for controlling an operation of the power conversion circuit. The detection circuit is coupled to the control unit and the first detecting terminal of the first power connector for detecting if the first detecting terminal is connected or disconnected with a predetermined voltage terminal and correspondingly generating a power transmission status signal to the control unit. When the detection circuit detects the first detecting terminal is connected with the predetermined voltage terminal, the power transmission status signal is under an enabled status and the control unit controls the power conversion circuit to generate or output the output voltage to the load according to the power transmission status signal; and when the detection circuit detects the first detecting terminal is disconnected with the predetermined voltage terminal, the power transmission status signal is under a disabled status and the control unit controls the power conversion circuit not to generate or output the output voltage to the load according to the power transmission status signal.

In accordance with another aspect of the present invention, there is provided a power supply for providing power to a load. The power supply includes a first power connector, a power conversion circuit, a first hot-plug connector, a control unit and a detection circuit. The first power connector includes a plurality of power terminals and a first detecting terminal. The power conversion circuit is coupled to the power terminals of the first power connector for receiving an input voltage and converting the input voltage into an output voltage. The first hot-plug connector is coupled to the power conversion circuit and includes a plurality of power pins, a first detecting pin and a first connection pin, wherein the plurality of power pins of the first hot-plug connector are coupled to a plurality of power pins of a second hot-plug connector of the load, the first detecting pin of the first hot-plug connector is coupled to a second detecting pin of the second hot-plug connector, and the first connection pin of the first hot-plug connector is coupled to a second connection pin of the second hot-plug connector. The control unit is coupled to the power conversion circuit for controlling an operation of the power conversion circuit. The detection circuit is coupled to the control unit and coupled to the first detecting terminal of the first power connector via a connection loop of the first connection pin, the second connection pin, the second detecting pin and the first detecting pin for detecting if the first detecting terminal or the first detecting pin is connected or disconnected with a predetermined voltage terminal and correspondingly generating a power transmission status signal to the control unit. When the detection circuit detects the first detecting terminal or the first detecting pin is connected with the predetermined voltage terminal, the power transmission status signal is under an enabled status and the control unit controls the power conversion circuit to generate or output the output voltage to the load according to the power transmission status signal; and when the detection circuit detects the first detecting terminal or the first detecting pin is disconnected with the predetermined voltage terminal, the power transmission status signal is under a disabled status and the control unit controls the power conversion circuit not to generate or output the output voltage to the load according to the power transmission status signal.

In accordance with a further aspect of the present invention, there is provided a power supplying system including at least a switch element and at least a power supply, wherein one end of the switch element is coupled with a predetermined voltage terminal, and an on/off status of the switch element is controlled by a control signal of a remote control device. The power supply includes a first power connector, a power conversion circuit, a control unit and a detection circuit. The first power connector includes a plurality of power terminals and a first detecting terminal, and the first detecting terminal is coupled with another end of the switch element. The power conversion circuit is coupled to the power terminals of the first power connector for receiving an input voltage and converting the input voltage into an output voltage. The control unit is coupled to the power conversion circuit for controlling an operation of the power conversion circuit. The detection circuit is coupled to the control unit and the first detecting terminal of the first power connector for detecting if the first detecting terminal is connected or disconnected with the predetermined voltage terminal and correspondingly generating a power transmission status signal to the control unit. When the detection circuit detects the first detecting terminal is connected with the predetermined voltage terminal, the power transmission status signal is under an enabled status and the control unit controls the power conversion circuit to generate or output the output voltage to the load according to the power transmission status signal; and when the detection circuit detects the first detecting terminal is disconnected with the predetermined voltage terminal, the power transmission status signal is under a disabled status and the control unit controls the power conversion circuit not to generate or output the output voltage to the load according to the power transmission status signal.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
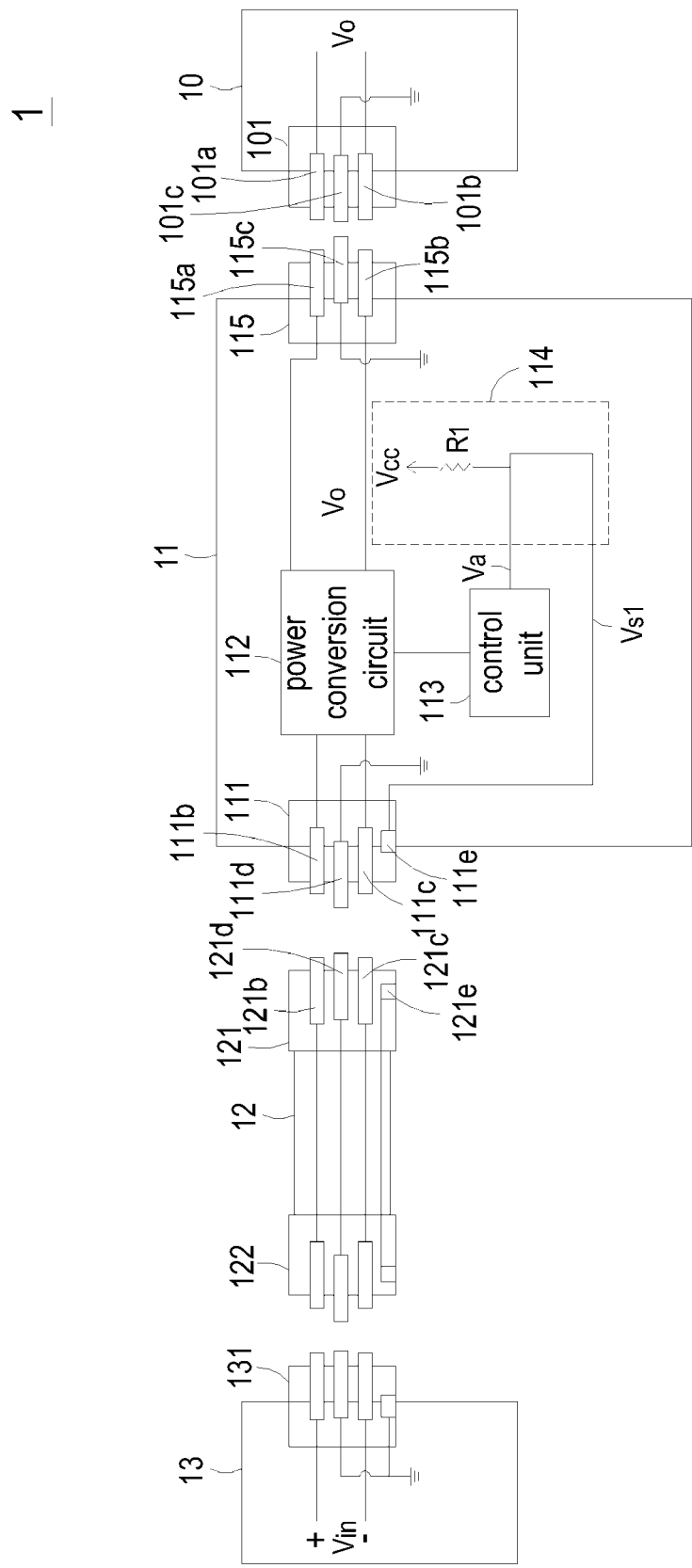
FIG. 1 is a circuit block diagram showing a power supply used for a data-processing system and having power protection mechanism and remote power management function according to a first preferred embodiment of the present invention.
Figure 2:
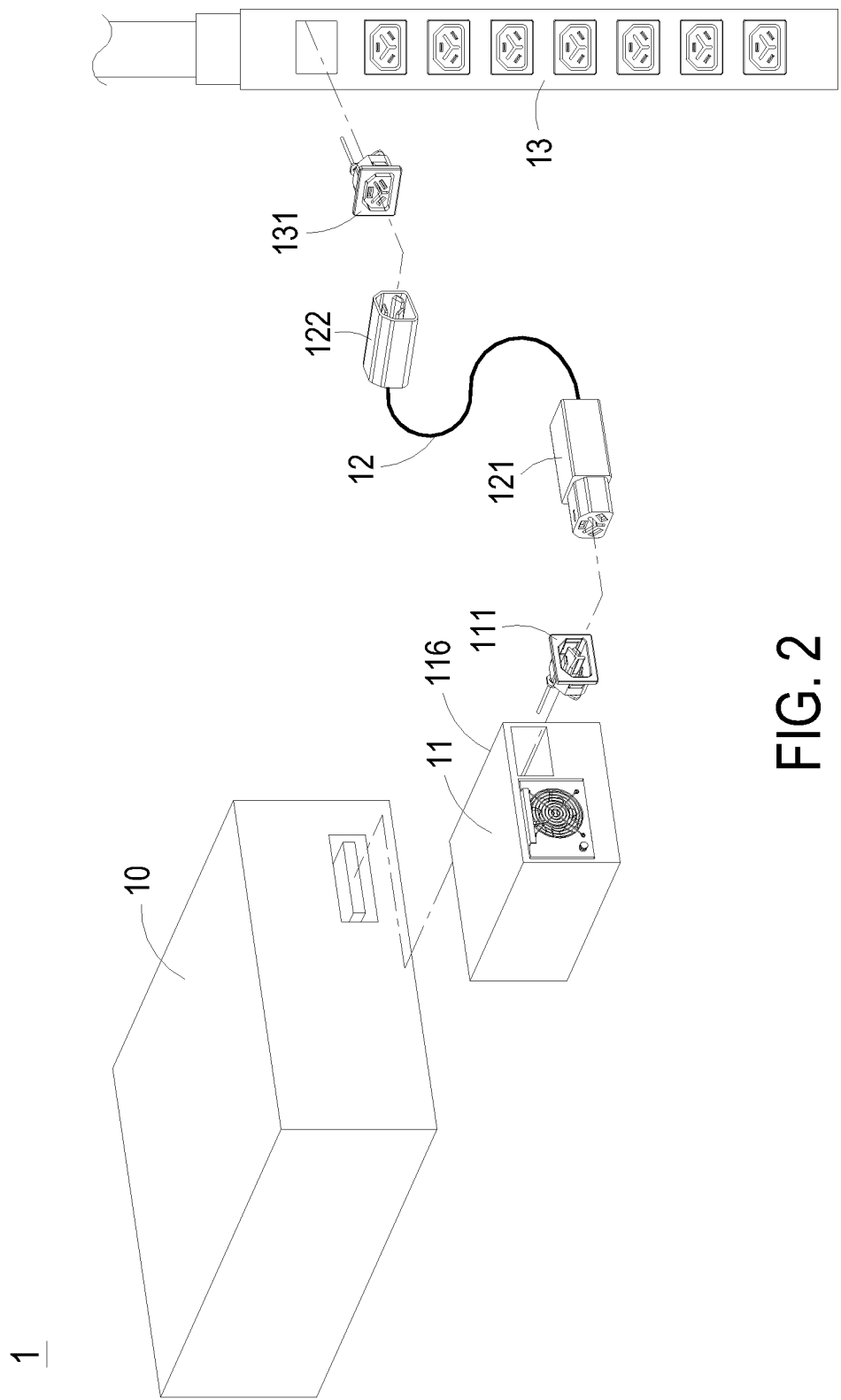
FIG. 2 is a schematic diagram of FIG. 1.

FIG. 1 is a circuit block diagram showing a power supply used for a data-processing system and having power protection mechanism and remote power management function according to a first preferred embodiment of the present invention; and FIG. 2 is a schematic diagram of FIG. 1 according to the preferred embodiment of the present invention. As shown in FIGS. 1 and 2, the data-processing system 1 comprises one or more data-processing equipments 10, for example one or more servers. The data-processing equipment 10 is electrically coupled with one or more power supplies 11 and supplied power by the one or more power supplies 11. For describing the technical features of the present invention briefly, in an embodiment, the data-processing equipment 10 is electrically coupled to the power supply 11 and supplied power by the power supply 11, wherein the power supply 11 has power protection mechanism (also called arc flash protection mechanism) and remote power management function. The power supply 11 comprises a first power connector 111 (i.e. socket), a power conversion circuit 112, a control unit 113, a detection circuit 114 and a first hot-plug connector 115 (i.e. power and signal transmission interface). The power supply 11 receives an input voltage $V_{in}$ from a power distribution unit (PDU) 13 via a power cable 12 and converting the input voltage $V_{in}$ into output voltage $V_o$ so as to provide the output voltage $V_o$ to the data-processing equipment 10, for example rack server of a data center. The power cable 12 is coupled between the power distribution unit 13 and the power supply 11 and comprises a second power connector 121 (i.e. plug). The combination of the first power connector 111 and the second power connector 121 is defined as a power connector assembly. The first power connector 111 is disposed on a casing 116 of the power supply 11, which is electrically coupled to the data-processing equipment 10 of the data-processing system 1 and provides desired power to the data-processing equipment 10 through the first hot-plug connector 115 of the power supply 11 and a second hot-plug connector 101 of the data-processing equipment 10. The second power connector 121 is disposed on an end of the power cable 12. The first power connector 111 is configured to be coupled with the second power connector 121 to achieve the structural and electrical connections.

Figure 3A:
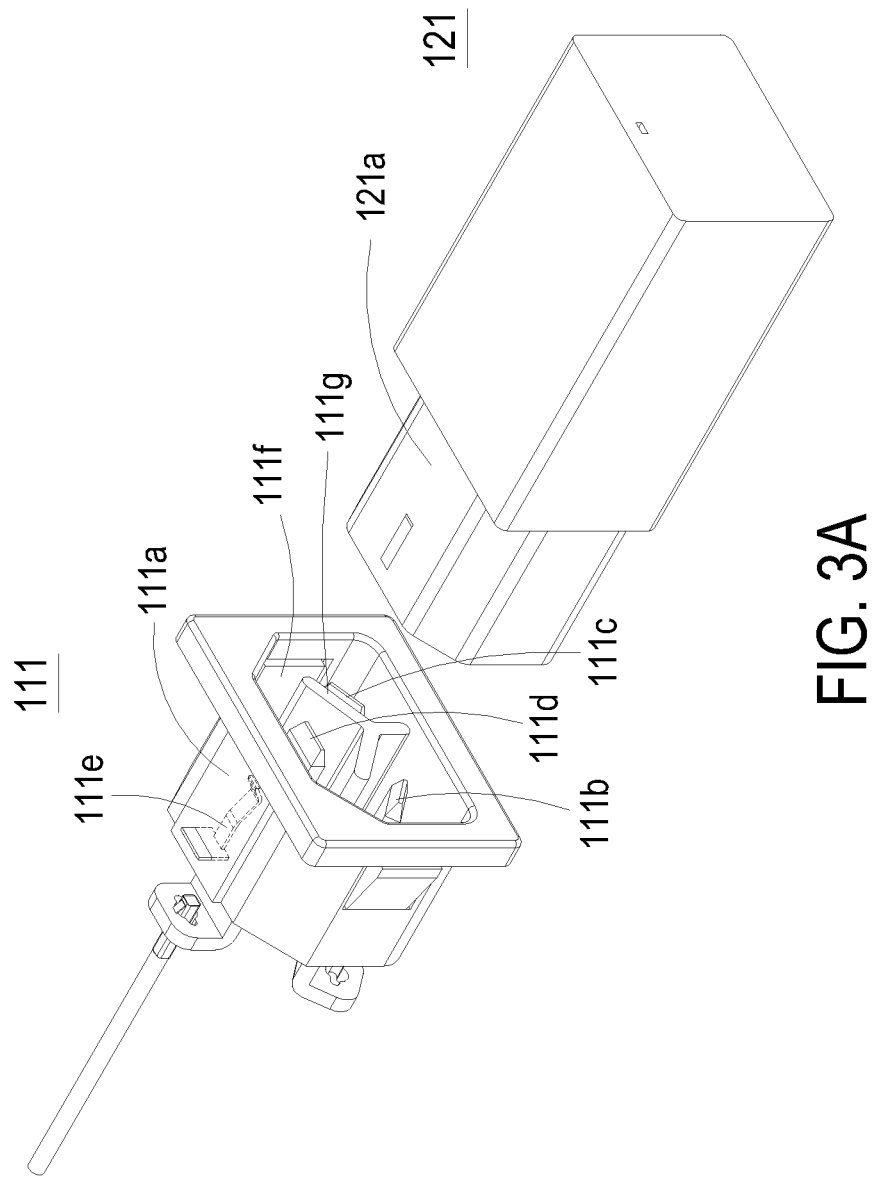
FIG. 3A is a schematic diagram showing the power connector assembly of FIGS. 1 and 2.
Figure 3C:
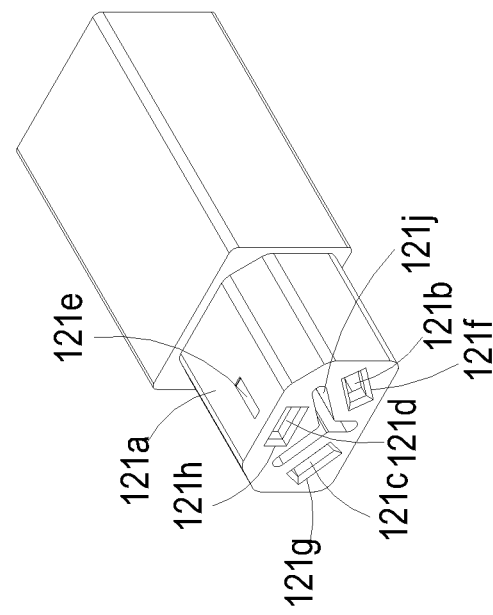
FIG. 3C is a schematic diagram showing the second power connector of the power connector assembly of FIG. 3A.
Figure 3B:
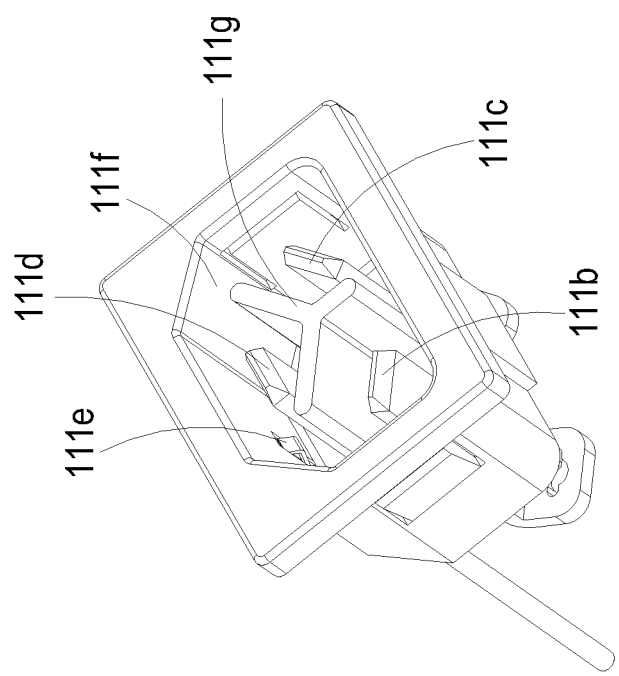
FIG. 3B is a schematic diagrams showing the first power connector of the power connector assembly of FIG. 3A.

FIG. 3A is a schematic diagram showing the power connector assembly of FIGS. 1 and 2; FIG. 3B is a schematic diagrams showing the first power connector of the power connector assembly of FIG. 3A; and FIG. 3C is a schematic diagram showing the second power connector of the power connector assembly of FIG. 3A. As shown in FIGS. 3A, 3B and 3C, the first power connector 111 comprises a first main body 111a, a plurality of power terminals 111b, 111c, 111d (i.e. a first set of power terminals) and a first detecting terminal 111e (i.e. first contact element). The first main body 111a includes a receptacle 111f for receiving at least portion of the second power connector 121. In an embodiment, the first power connector 111 includes a first power terminal 111b, a second power terminal 111c, a third power terminal 111d and a first detecting terminal 111e. The first detecting terminal 111e has a contact portion extending outwardly from one inner sidewall of the receptacle 111f of the first main body 111a and has a connection portion extending outwardly from one external sidewall of the first main body 111a. The distance from the opening of the receptacle 111f to the contact portion of the first detecting terminal 111e is longer than that from the opening of the receptacle 111f to the free ends of the first power terminal 111b, the second power terminal 111c and the third power terminal 111d. Namely, the length of the first detecting terminal 111e is shorter than that of each power terminal 111b, 111c, 111d. The first power connector 111 further comprises an isolation partition 111g disposed in the middle area of the receptacle 111f for isolating and separating the power terminals 111b~111d with each other. The isolation partition 111g can be formed in the Y-shaped or V-shaped (not shown). The connection portion of the first detecting terminal 111e of the first power connector 111 is coupled to the detection circuit 114 via connection wire or trace for generating a first detecting signal (i.e. PS_Kill).

The second power connector 121 comprises a second main body 121a, a plurality of power terminals 121b, 121c, 121d (i.e. a second set of power terminals) and a second detecting terminal 121e. The second main body 121a includes a plural of power terminal openings 121f, 121g, 121h formed on a first surface thereof. The power terminals 121b, 121c, 121d are respectively disposed in a corresponding power terminal opening 121f, 121g, 121h. In an embodiment, the second power connector 121 includes a first power terminal 121b, a second power terminal 121c, a third power terminal 121d and a second detecting terminal 121e (i.e. second contact element). The second detecting terminal 121e has a contact portion extending outwardly from one external sidewall of the second main body 121a. Preferably, the distance from the end of the second detecting terminal 121e to the edge of the second main body 121a is longer than that from the end of the first power terminal 121b, the second power terminal 121c and the third power terminal 121d to the edge or the power terminal openings of the second main body 121a. Namely, the length of the second detecting terminal 121e is shorter than that of each power terminal 121b, 121c, 121d. The second power connector 121 further comprises a receptacle 121j disposed in the second main body 121a for receiving the isolation partition 111g of the first power connector 111. The second detecting terminal 121e is connected with a predetermined voltage terminal to have a predetermined voltage level. In an embodiment, the second detecting terminal 121e has same voltage level with the third power terminal 121d, for example 0V. In an embodiment, the method to achieve that the second detecting terminal 121e has same voltage level with the third power terminal 121d can be performed by coupling the power connector 122 of the power cable 12 with the power connector 131 of the power distribution unit 13, and connecting the second detecting terminal 121e to ground. In an embodiment, the first power terminal 121b, the second power terminal 121c and the third power terminal 121d are L(line) terminal, N(Neutral) terminal and FG(Ground) terminal, respectively. Alternatively, the first terminal 121b, the second terminal 121c and the third terminal 121d are positive (+) terminal, negative (−) terminal and FG terminal, respectively.

As shown in FIGS. 1, 2 and 3A~3C, when the second power connector 121 (i.e. plug) of the power cable 12 is being coupled to the first power connector 111 (i.e. socket) of the power supply 11, the first power terminal 111b, the second power terminal 111c and the third power terminal 111d of the first power connector 111 will firstly contact with the first power terminal 121b, the second power terminal 121c and the third power terminal 121d of the second power connector 121, respectively. Finally, the first detecting terminal 111e of the first power connector 111 contacts with the second detecting terminal 121e of the second power connector 121. Namely, the contacts and connections between the power terminals of the first power connector 111 and the second power connector 121 are prior to the contact and connection between the detecting terminals of the first power connector 111 and the second power connector 121. When the first power connector 111 is being coupled with the second power connector 121, the power and signal connecting and delivering between the first power connector 111 and the second power connector 121 will be the power ground, the positive voltage and the negative voltage firstly, and the first detecting signal (i.e. PS_Kill) in sequence. When the second power connector 121 is abnormal to be pulled out and removed from the first power connector 111, the first detecting terminal 111e of the first power connector 111 will be detached from or disconnected with the second detecting terminal 121e of the second power connector 121 firstly. Namely, the detachment between the detecting terminals of the first power connector 111 and the second power connector 121 is prior to the detachments between the power terminals of the first power connector 111 and the second power connector 121.

In an embodiment, the input terminal of the power conversion circuit 112 is electrically coupled to the power terminals 111b~111c of the first power connector 111, the output terminal of the power conversion circuit 112 is electrically coupled to the power pins 115a~115c (for example a first power pin 115a, a second power pin 115b and a third power pin 115c) of the first hot-plug connector 115, and the power conversion circuit 112 is employed for receiving the input voltage $V_{in}$ and converting the input voltage $V_{in}$ into the output voltage $V_o$. Therefore, the electric energy of the input voltage $V_{in}$ can be transmitted to the input terminal of the power conversion circuit 112 via the power terminals 111b, 111c, 111d of the first power connector 111, and the electric energy of the output voltage $V_o$ can be transmitted to the data-processing equipment 10 via the power pins 115a, 115b, 115c of the first hot-plug connector 115 and the power pins 101a, 101b, 101c of the second hot-plug connector 101. The control unit 113 is electrically coupled to the power conversion circuit 112 for controlling the operations of the power conversion circuit 112.

The detection circuit 114 is electrically coupled to the control unit 113 and the first detecting terminal 111e of the first power connector 111 for detecting if the first detecting terminal 111e is connected or disconnected with the predetermined voltage terminal (such as ground) and correspondingly generating a power transmission status signal $V_a$ to the control unit 113. In an embodiment, the detection circuit 114 can detect the power connection status of the first power connector 111 and comprises a first pull-up resistor $R_1$ (i.e. current-limiting circuit) electrically connected between an auxiliary voltage $V_{cc}$, for example 3.3V and the first detecting terminal 111e of the first power connector 111. The auxiliary voltage $V_{cc}$ is a DC voltage source, which may be provided from the power conversion circuit 112 of the power supply 11.

In accordance with one aspect of the present invention, when the first power connector 111 is connected to the second power connector 121, the power terminals 111b~111d of the first power connector 111 will firstly contact with the power terminals 121b~121d of the second power connector 121. Thereafter, the first detecting terminal 111e of the first power connector 111 contacts with the second detecting terminal 121e of the second power connector 121. In addition, when the second power connector 121 is abnormal to be pulled out and removed from the first power connector 111, the first detecting terminal 111e of the first power connector 111 will be detached from and disconnected with the second detecting terminal 121e of the second power connector 121 firstly. Thereafter, the power terminals 111b~111d of the first power connector 111 are detached from and disconnected with the power terminals 121b~121d of the second power connector 121.

In an embodiment, when the first power connector 111 of the power supply 11 is disconnected with the second power connector 121 of the power cable 12, the first detecting terminal 111e of the first power connector 111 provides a first detecting signal $V_{s1}$ under a disabled status, for example high voltage level 3.3V, that is used to detect when the first power connector 111 is being removed or disconnected with the second power connector 121. In other words, the detection circuit 114 detects that the first detecting terminal 111e is disconnected with the predetermined voltage terminal (such as ground), so as to detect when the first power connector 111 is being removed or disconnected with the second power connector 121. Meanwhile, the detection circuit 114 generates a power transmission status signal $V_a$ under a disabled status to the control unit 113 in response to the first detecting signal $V_{s1}$. Therefore, the control unit 113 determines that the first power connector 111 is disconnected with the second power connector 121 according to the power transmission status signal $V_a$ and controls the power conversion circuit 112 not to generate or output the output voltage $V_o$ to a load.

In an embodiment, when the second power connector 121 of the power cable 12 is being coupled to first power connector 111 of the power supply 11, the power terminal 121b, 121c, 121d of the second power connector 121 will firstly contact with the power terminal 111b, 111c, 111d of the first power connector 111. At this moment, the first detecting signal $V_{s1}$ and the power transmission status signal $V_a$ are under disabled status, and the control unit 113 determines that the first power connector 111 is disconnected with the second power connector 121 according to the power transmission status signal $V_a$ and controls the power conversion circuit 112 not to generate or output the output voltage $V_o$. Therefore, there is no electric current flowing between the contacts of the power connectors so that the generation of arc flash between the contacts of the power connectors will be prevented and the damages to the power supply or the data-processing system will be prevented. When the second power connector 121 of the power cable 12 is still and further coupled to the first power connector 111 of the power supply 11 and when the first detecting terminal 111e of the first power connector 111 contacts with the second detecting terminal 121e of the second power connector 121, the first detecting signal $V_{s1}$ and the power transmission status signal Va are changed from the disabled statuses to an enabled statuses, for example changing from a higher voltage level 3.3V to a lower voltage level 0V. The control unit 113 determines that the second power connector 121 is coupled with the first power connector 111 totally and securely and controls the power conversion circuit 112 to operate to generate or output the output voltage $V_o$.

In an embodiment, when the second power connector 121 of the power cable 12 is being detached and removed from the first power connector 111 of the power supply 11, the second detecting terminal 121e is detached from and disconnected with the first detecting terminal 111e firstly. At this moment, the first detecting signal $V_{s1}$ of the first detecting terminal 111e and the power transmission status signal $V_a$ of the detection circuit 114 will be changed from the enabled statuses to the disabled statuses, and the control unit 113 determines that the second power connector 121 is detached from and disconnected with the first power connector 111 or the user would like to separate the second power connector 121 from the first power connector 111 and controls the power conversion circuit 112 not to operate to generate or output the output voltage $V_o$. Therefore, there is no electric current flowing between the contacts of the power connectors. Thereafter, the power terminals 121b~121d of the second power connector 121 will be detached from and disconnected with the power terminals 111b~111d of the first power connector 111 so that the generation of arc flash between the contacts of the power connectors will be prevented and the damages to the power supply or the data-processing system will be prevented.

In an embodiment, the power connector assembly of the first power connector 111 and the second power connector 121 also can be employed for the connection between the power supply 11 and the data-processing equipment 10 or employed for the connection between the power distribution unit 13 and the power cable 12. As shown in FIG. 1, the power distribution unit 13 has a power connector 131 and the power cable 12 has a mating power connector 122. The power connector assembly can also be employed to prevent arc flash generation. The operating functions of the power connector assembly of the power connector 131 and the power connector 122 employed for the power distribution unit 13 and the power cable 12 is identical to the power connector assembly of the first power connector 111 and the second power connector 121 employed for the power cable 12 and the power supply 11 as shown in FIGS. 1, 2 and 3A~3C, and are not redundantly described herein.

Figure 4:
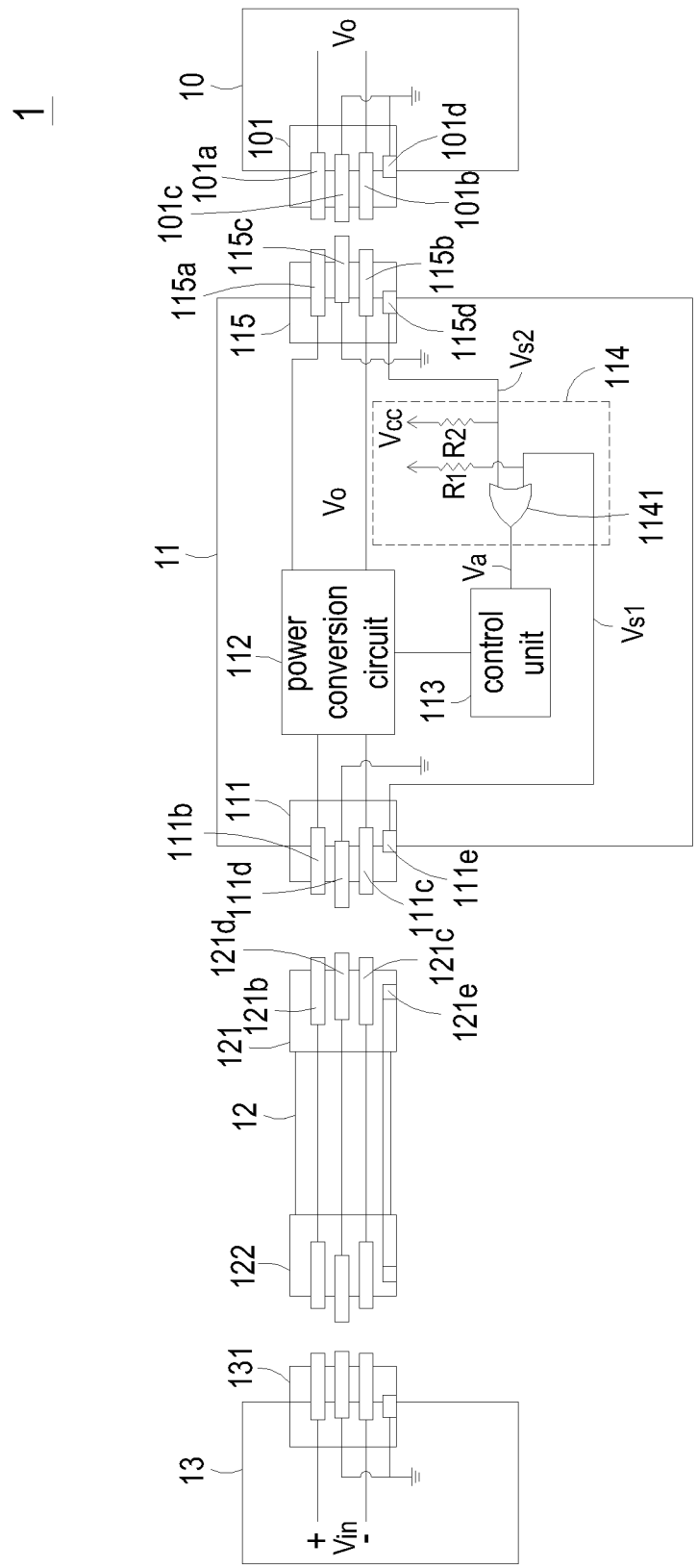
FIG. 4 is a circuit block diagram showing a power supply used for a data-processing system and having power protection mechanism and remote power management function according to a second preferred embodiment of the present invention.

FIG. 4 is a circuit block diagram showing a power supply used for a data-processing system and having power protection mechanism and remote power management function according to a second preferred embodiment of the present invention. As shown in FIGS. 2, 3A~3C and 4, the first hot-plug connector 115 of the power supply 11 and the second hot-plug connector 101 of the data-processing equipment 10 employ similar concepts with the power connector assembly of the first power connector 111 and the second power connector 121. In this embodiment, the first hot-plug connector 115 comprises a first set of power pins 115a, 115b, 115c (for example a first power pin 115a, a second power pin 115b and a third power pin 115c) and a first detecting pin 115d, and the second hot-plug connector 101 comprises a second set of power pins 101a, 101b, 101c (for example a first power pin 101a, a second power pin 101b and a third power pin 101c) and a second detecting pin 101d. When the first hot-plug connector 115 is being coupled with the second hot-plug connector 101, the first set of power pins 115a~115c of the first hot-plug connector 115 will firstly contact with the second set of power pins 101a~101c of the second hot-plug connector 101. Thereafter, the first detecting pin 115d of the first hot-plug connector 115 contacts with the second detecting pin 101d of the second hot-plug connector 101. In addition, when the first hot-plug connector 115 is being detached from or disconnected with the second hot-plug connector 101, the first detecting pin 115d of the first hot-plug connector 115 will be detached from and disconnected with the second detecting pin 101d of the second hot-plug connector 101, firstly. Thereafter, the first set of power pins 115a~115c of the first hot-plug connector 115 are detached from and disconnected with the second set of power pins 101a~101c of the second hot-plug connector 101.

The detection circuit 114 comprises a first pull-up resistor $R_1$, a second pull-up resistor $R_2$ and an OR logic circuit 1141. The second pull-up resistor $R_2$ is electrically coupled between an auxiliary voltage $V_{cc}$ and the first detecting pin 115d. The output terminal of the OR logic circuit 1141 is electrically coupled to the control unit 113. The first input terminal of the OR logic circuit 1141 is electrically coupled to the first detecting terminal 111e of the first power connector 111, and the second input terminal of the OR logic circuit 1141 is electrically coupled to the first detecting pin 115d of the first hot-plug connector 115.

In an embodiment, when either the first power connector 111 of the power supply 11 is being detached and removed from the second power connector 121 of the power cable 12 or the first hot-plug connector 115 is being detached and removed from the second hot-plug connector 101, the first detecting terminal 111e of the first power connector 111 will be detached from and disconnected with the second detecting terminal 121e of the second power connector 101 firstly or the first detecting pin 115d of the first hot-plug connector 115 will be detached from and disconnected with the second detecting pin 101d of the second hot-plug connector 101, firstly. At this moment, the first detecting terminal 111e of the first power connector 111 generates a first detecting signal $V_{s1}$ under a disabled status, for example high voltage level 3.3V, or the first detecting pin 115d of the first hot-plug connector 115 generates a second detecting signal $V_{s2}$ under a disabled status, for example high voltage level 3.3V. In other words, the detection circuit 114 detects that the first detecting terminal 111e of the first power connector 111 is disconnected with the predetermined voltage terminal (such as ground), or detects that the first detecting pin 115d of the first hot-plug connector 115 is disconnected with the predetermined voltage terminal (such as ground). Correspondingly, the detection circuit 114 generates a power transmission status signal $V_a$ under a disabled status to the control unit 113 in response to the first detecting signal $V_{s1}$ or the second detecting signal $V_{s2}$. Therefore, the control unit 113 determines that the first power connector 111 is detached from and disconnected with the second power connector 121 or the user would like to separate the first power connector 111 with the second power connector 121 and/or the first hot-plug connector 115 is detached from and disconnected with the second hot-plug connector 101 or the user would like to separate the first hot-plug connector 115 with the second hot-plug connector 101 according to the connection status signal $V_a$ and controls the power conversion circuit 112 not to generate or output the output voltage $V_o$. Therefore, there is no electric current flowing between the contacts of the power connectors 111, 121 and the contacts of the hot-plug connectors 115, 101. Thereafter, the power terminals 121b~121d of the second power connector 121 will be detached from and disconnected with the power terminals 111b~111d of the first power connector 111 or the power pins 115a~115c of the first hot-plug connector 115 will be detached from and disconnected with the power pins 101a~101c of the second hot-plug connector 101 so that the generation of arc flash between the contacts of the power connectors or the contacts of the hot-plug connectors will be prevented and the damages to the power supply or the data-processing system will be prevented.

Figure 5:
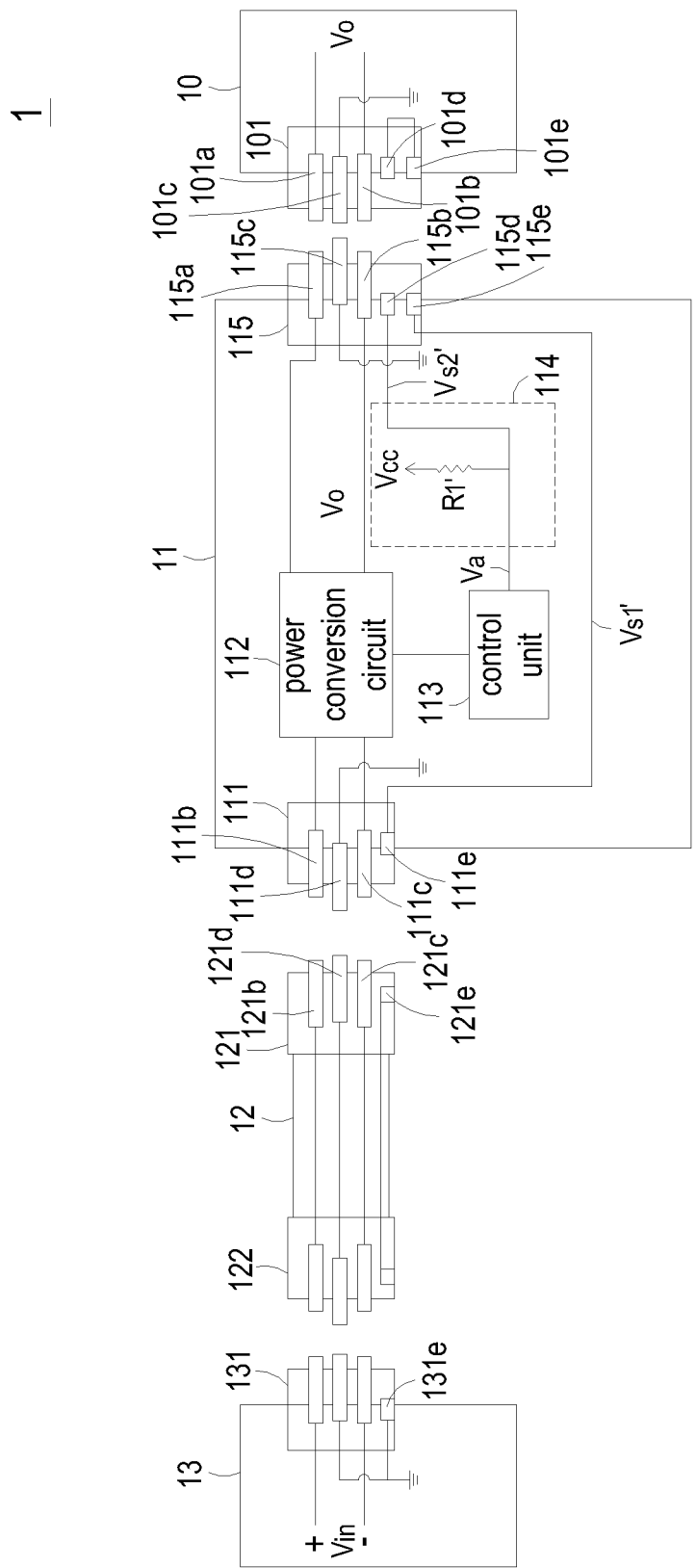
FIG. 5 is a circuit block diagram showing a power supply used for a data-processing system and having power protection mechanism and remote power management function according to a third preferred embodiment of the present invention.

FIG. 5 is a circuit block diagram showing a power supply used for a data-processing system and having power protection mechanism and remote power management function according to a third preferred embodiment of the present invention. As shown in FIGS. 2, 3A~3C and 5, the first hot-plug connector 115 comprises a first set of power pins 115a, 115b, 115c, a first detecting pin 115d and a first connection pin 115e, and the second hot-plug connector 101 comprises a second set of power pins 101a, 101b, 101c, a second detecting pin 101d and a second connection pin 101e, wherein the second detecting pin 101d is coupled to the second connection pin 101e. When the first hot-plug connector 115 is being coupled with the second hot-plug connector 101, the first set of power pins 115a~115c of the first hot-plug connector 115 will firstly contact with the second set of power pins 101a~101c of the second hot-plug connector 101. Thereafter, the first detecting pin 115d of the first hot-plug connector 115 contacts with the second detecting pin 101d of the second hot-plug connector 101 and the first connection pin 115e of the first hot-plug connector 115 contacts with the second connection pin 101e of the second hot-plug connector 101. In addition, when the first hot-plug connector 115 is being detached from or disconnected with the second hot-plug connector 101, the first detecting pin 115d of the first hot-plug connector 115 will be detached from and disconnected with the second detecting pin 101d of the second hot-plug connector 101 and the first connection pin 115e of the first hot-plug connector 115 will be detached from and disconnected with the second connection pin 101e of the second hot-plug connector 101, firstly. Thereafter, the first set of power pins 115a~115c of the first hot-plug connector 115 are detached from and disconnected with the second set of power pins 101a~101c of the second hot-plug connector 101. The first detecting pin 115d and the first connection pin 115e of the first hot-plug connector 115 are configured to be connected with the second detecting pin 101d and the second connection pin 101e of the second hot-plug connector 101 respectively.

The detection circuit 114 comprises a pull-up resistor R1'. The pull-up resistor R1' is electrically coupled between an auxiliary voltage and the first detecting pin 115d of the first hot-plug connector 115.

In an embodiment, when the first hot-plug connector 115 is coupled with the second hot-plug connector 101, the first set of power pins 115a~115c of the first hot-plug connector 115 contact with the second set of power pins 101a~101c of the second hot-plug connector 101, the first detecting pin 115d of the first hot-plug connector 115 contacts with the second detecting pin 101d of the second hot-plug connector 101, and the first connection pin 115e of the first hot-plug connector 115 contacts with the second connection pin 101e of the second hot-plug connector 101. At this moment, the first detecting terminal 111e of the first power connector 111 provides a first detecting signal $V_{s1}'$ (i.e. $V_{s1}'$ delivers the signal level from the detecting terminal 131e of the power connector 131 of the power distribution unit 13) under an enabled status, for example low voltage level 0V, to the detection circuit 114 via the connection path of the first connection pin 115e, the second connection pin 101e, the second detecting pin 101d and the first detecting pin 115d.

In an embodiment, when the first power connector 111 of the power supply 11 is being detached and removed from the second power connector 121 of the power cable 12, the first detecting terminal 111e of the first power connector 111 will be detached from and disconnected with the second detecting terminal 121e of the second power connector 121 firstly. At this moment, the first detecting terminal 111e of the first power connector 111 provides a first detecting signal $V_{s1}'$ under a disabled status, for example high voltage level 3.3V, to the detection circuit 114 via the connection path of the first connection pin 115e, the second connection pin 101e, the second detecting pin 101d and the first detecting pin 115d. Correspondingly, the detection circuit 114 generates a power transmission status signal $V_a$ (i.e. the signal level is high at the moment) under a disabled status in response to the first detecting signal $V_{s1}'$ to the control unit 113. Therefore, the control unit 113 determines that the first power connector 111 is detached from and disconnected with the second power connector 121 or the user would like to separate the first power connector 111 with the second power connector 121 according to the power transmission status signal $V_a$ (i.e. the signal level was changed from low to high) and controls the power conversion circuit 112 not to generate or output the output voltage $V_o$. Therefore, there is no electric current flowing between the contacts of the power connectors 111, 121. Thereafter, the power terminals 121b~121d of the second power connector 121 will be detached from and disconnected with the power terminals 111b~111d of the first power connector 111 so that the generation of arc flash between the contacts of the power connectors will be prevented and the damages to the power supply or the data-processing system will be prevented.

In an embodiment, when the first hot-plug connector 115 is being detached and removed from the second hot-plug connector 101, the first detecting pin 115d of the first hot-plug connector 115 will be detached from and disconnected with the second detecting pin 101d of the second hot-plug connector 101 and the first connection pin 115e of the first hot-plug connector 115 will be detached from and disconnected with the second connection pin 101e of the second hot-plug connector 101, firstly. At this moment, the first detecting pin 115d of the first hot-plug connector 115 provides a second detecting signal $V_{s2}'$ under a disabled status, for example high voltage level 3.3V. Correspondingly, the detection circuit 114 generates a power transmission status signal $V_a$ under a disabled status in response to the second detecting signal $V_{s2}'$ to the control unit 113. Therefore, the control unit 113 determines that the first hot-plug connector 115 is detached from and disconnected with the second hot-plug connector 101 or the user would like to separate the first hot-plug connector 115 with the second hot-plug connector 101 according to the power transmission status signal $V_a$ and controls the power conversion circuit 112 not to generate or output the output voltage $V_o$. Therefore, there is no electric current flowing between the contacts of the hot-plug connectors 115, 101. Thereafter, the power pins 115a~115c of the first hot-plug connector 115 will be detached from and disconnected with the power pins 101a~101c of the second hot-plug connector 111 so that the generation of arc flash between the contacts of the hot-plug connectors will be prevented and the damages to the power supply or the data-processing system will be prevented.

In an embodiment, the connection of the second detecting pin 101d and the second connection pin 101e can be further coupled to a controller of the data-processing equipment 10 of the data-processing system 1 (not shown in FIG. 5). When the power supply 11 is coupled with the data-processing equipment 10 by the first hot-plug connector 115 and the second hot-plug connector 101 and when the second power connector 121 (i.e. plug) of the power cable 12 is coupled to the first power connector 111 (i.e. socket) of the power supply 11, the third power terminal 111d of the first power connector 111 will firstly contact with the third power terminal 121d of the second power connector 121. Then, the first power terminal 111b and the second power terminal 111c of the first power connector 111 will contact with the first power terminal 121b and the second power terminal 121c of the second power connector 121, respectively. Finally, the first detecting terminal 111e of the first power connector 111 will contact with the second detecting terminal 121e of the second power connector 121. Namely, when the first power connector 111 is coupled with the second power connector 121, the power and signal connecting and delivering between the first power connector 111 and the second power connector 121 will be the power ground, the positive voltage and the negative voltage, and the first detecting signal $V_{s1}'$ (i.e. PS_Kill) in sequence. Due to the second connection pin 101e is connected to the second detecting pin 101d, the second connection pin 101e also has the same voltage level with the second detecting pin 101d when the second power connector 121 (i.e. plug) is coupled to the first power connector 111 (i.e. socket) and the first hot-plug connector 115 is coupled to the second hot-plug connector 101. Accordingly, the control unit 113 will receive the power transmission status signal $V_a$ or the data-processing equipment 10 will receive the detecting signal (i.e. PS_Kill signal), which is an enabled status (i.e. under low voltage level). In this situation, the power supply 11 of the data-processing system 1 is working (i.e. under on status) and operating, and the electric current will pass through from the first power terminal 121b and the second power terminal 121c of the second power connector 121 to the first power terminal 111b and the second power terminal 111c of the first power connector 111.

In addition, when the data-processing equipment 10 is supplied power by the power supply 11, and when the second power connector 121 is abnormal to be pulled out from the first power connector 111, the first detecting terminal 111e of the first power connector 111 will be detached form and disconnected with the second detecting terminal 121e of the second power connector 121 firstly so that the detecting signal (i.e. PS_Kill signal) will be interrupted and the auxiliary voltage $V_{cc}$ will be provided to the data-processing equipment 10 via the first detecting pin 115d, the second detecting pin 101d, the second connection pin 101e and the first connection pin 115e of the hot-plug connectors 115, 101. Accordingly, the data-processing equipment 10 of the data-processing system 1 detects that the second detecting pin 101d is under disabled status (i.e. high voltage level). Accordingly, the control unit 113 is operative to change from a normal power output status to a stop-output status (i.e. under off status) immediately according to the disabled status or the data-processing equipment 10 is operative to change from a normal on-loading status to a stop-loading status according to the disabled status so that the electric current which passes through the first power terminal 121b and the second power terminal 121c of the second power connector 121 and the first power terminal 111b and the second power terminal 111c of the first power connector 111 will be decreased or zero. Therefore, when the control unit 113 of the power supply 11 or the data-processing equipment 10 detects that a connector of an external power source is detached or pulled out from a connector of a power supply thereof unintentionally or accidentally, the generation of arc flash between the contacts of the connectors will be prevented and the damages to the data-processing system will be prevented.

Figure 6A:
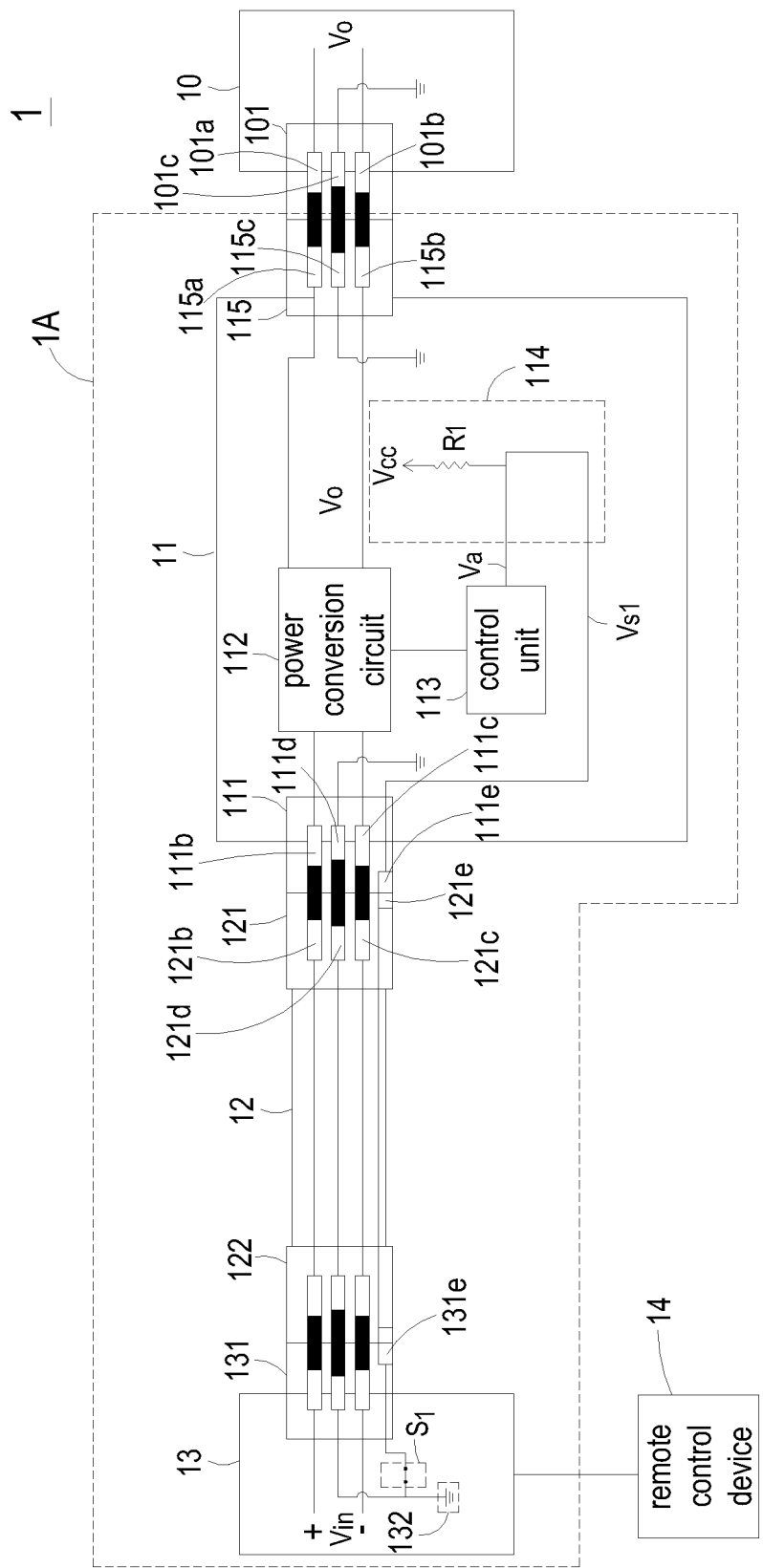
FIG. 6A is a circuit block diagram showing a power supply and a power supplying system used for a data-processing system and having power protection mechanism and remote power management function according to a fourth preferred embodiment of the present invention.
Figure 6B:
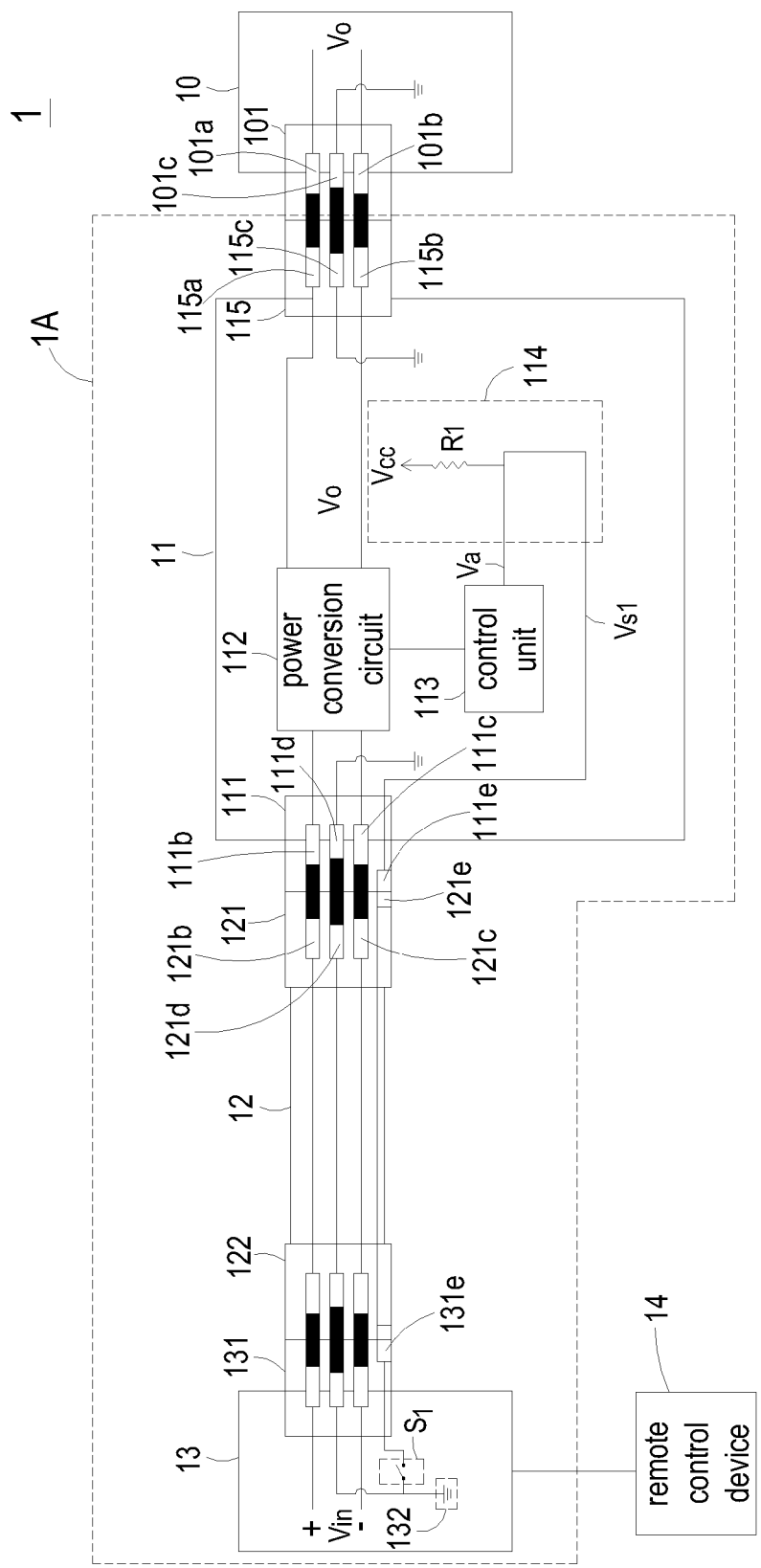
FIG. 6B shows the circuit block diagram of FIG. 6A when the switch element is turned off.
Figure 7:
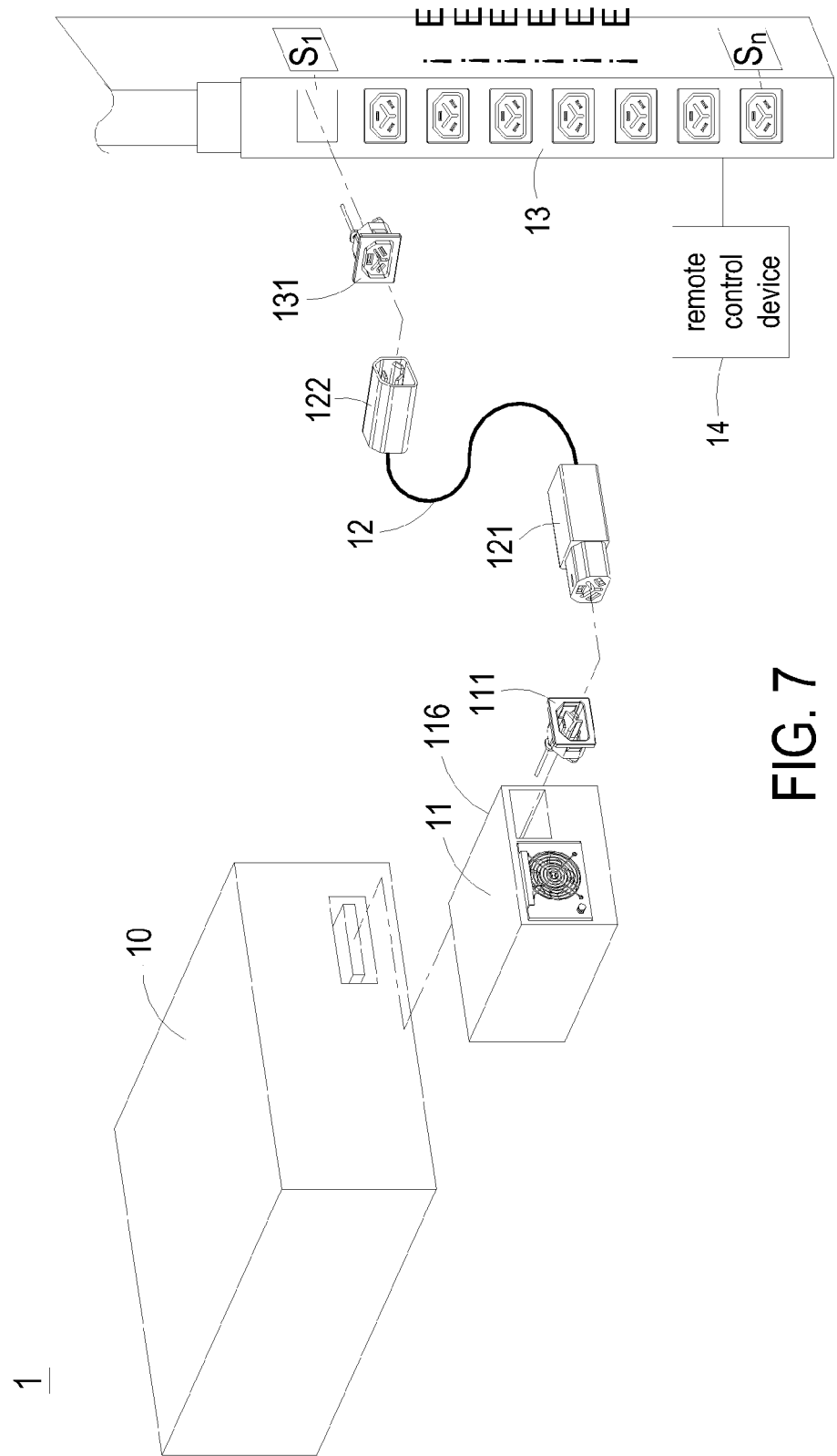
FIG. 7 is a schematic diagram of FIG. 6A.

FIG. 6A is a circuit block diagram showing a power supply and a power supplying system used for a data-processing system and having power protection mechanism and remote power management function according to a fourth preferred embodiment of the present invention, FIG. 6B shows the circuit block diagram of FIG. 6A when the switch element is turned off, and FIG. 7 is a schematic diagram of FIG. 6A. As shown in FIGS. 3A to 3C, 6A, 6B and 7, the data-processing system 1 comprises one or more data-processing equipments 10 and a power supplying system 1A, wherein the power supplying system 1A comprises one or more power supplies 11, one or more power cables 12, and one or more power distribution units 13. The power supply 11 is coupled with the data-processing equipment 10, and comprises a first power connector 111, a power conversion circuit 112, a control unit 113, a detection circuit 114. The structures and mechanisms of the power supply 11 in this embodiment are similar to those of the power supply 11 shown in FIG. 1, and are thus not redundantly described herein.

In this embodiment, the first power connector 111 comprises the plurality of power terminals 111b~111d and the first detecting terminal 111e, wherein the plurality of power terminals 111b~111d are coupled with the plurality of power terminals 121b~121d of the second power connector 121, respectively. The first detecting terminal 111e is coupled with the second detecting terminal 121e of the second power connector 121, and provides a detecting signal (i.e. the first detecting signal $V_{s1}$) to indicate if the first detecting terminal 111e is connected or disconnected with a predetermined voltage terminal 132 (such as ground) through the second detecting terminal 121e of the second power connector 121. Therefore, the detection circuit 114 can detect if the first detecting terminal 111e is connected or disconnected with the predetermined voltage terminal 132, and correspondingly generate a power transmission status signal $V_a$ to the control unit 113.

In this embodiment, the power distribution unit 13 transmits the input voltage $V_{in}$ to the power supply 11 through the power cable 12. The power distribution unit 13 comprises at least a switch element $S_1$~$S_n$ and at least a power connector 131. Each power connector 131 is coupled with a corresponding switch element (for example the switch element $S_1$) and input voltage $V_{in}$, and one terminal of the switch element $S_1$ is coupled with the predetermined voltage terminal 132. The power connector 131 comprises a detecting terminal 131e, wherein one end of the detecting terminal 131e is coupled with the second detecting terminal 121e of the second power connector 121 through the power cable 12, and another end of the detecting terminal 131e is coupled with another end of the switch element $S_1$. In this embodiment, the on/off status of the switch element $S_1$ is controlled by a control signal of a remote control device 14. Therefore, by means of controlling the on/off status of the switch element $S_1$ by the remote control device 14, the connection status between the first detecting terminal 111e of the first power connector 111 and the predetermined voltage terminal 132 can be changed. As a result, the detection circuit 114 of the power supply 11 correspondingly generates a power transmission status signal $V_a$ to the control unit 113, so that the control unit 113 correspondingly controls the power supply 11 to operate or not operate for achieving remote power management and control, and the aforesaid power protection mechanism is also preserved. In this embodiment, the control signal of the remote control device 14 can be transmitted by wired or wireless transmission, such as internet, so as to achieve remote control and management.

In this embodiment, when the first detecting terminal 111e of the first power connector 111 is disconnected with the predetermined voltage terminal 132 through the second detecting terminal 121e of the second power connector 121, the power transmission status signal $V_a$ is under a disabled status, and the control unit 113 controls the power conversion circuit 112 not to generate or output the output voltage $V_o$ to the data-processing equipment 10 according to the power transmission status signal $V_a$. In some embodiments, the switch elements $S_1$~$S_n$ can be installed in an uninterruptible power system (UPS), but not limited thereto.

In accordance with one aspect of the present invention, when the first power connector 111 is connected with the second power connector 121, the power terminals 111b~111d of the first power connector 111 contact with the power terminals 121b~121d of the second power connector 121, and the first detecting terminal 111e of the first power connector 111 contacts with the second detecting terminal 121e of the second power connector 121. When the mating power connector 122 of the power cable 12 is connected with the power connector 131 of the power distribution unit 13, the second detecting terminal 121e of the second power connector 121 is coupled with the detecting terminal 131e of the power connector 131 indirectly. In this embodiment, when the remote control device 14 sends out a control signal to remote control the switch element $S_1$ to be turned on (as shown in FIG. 6A), the first detecting terminal 111e of the first power connector 111 is coupled with the predetermined voltage terminal (such as ground) 132 through the second detecting terminal 121e and the detecting terminal 131e. On the contrary, when the remote control device 14 sends out a control signal to remote control the switch element $S_1$ to be turned off (as shown in FIG. 6B), the first detecting terminal 111e of the first power connector 111 is disconnected with the predetermined voltage terminal (such as ground) 132 through the second detecting terminal 121e and the detecting terminal 131e.

In an embodiment, when the power supply is under normal operation to output the output voltage $V_o$ to a load, such as the data-processing equipment 10, the second power connector 121 of the power cable 12 is connected with the first power connector 111 of the power supply 11, the mating power connector 122 of the power cable 12 is connected with the power connector 131 of the power distribution unit 13, and the remote control device 14 sends out a control signal to remote control the switch element $S_1$ to be turned on, so that the first detecting terminal 111e of the first power connector 111 is coupled with the predetermined voltage terminal (such as ground) 132 through the second detecting terminal 121e and the detecting terminal 131e (as shown in FIG. 6A). At the moment, the first detecting terminal 111e of the first power connector 111 provides the first detecting signal $V_{s1}$ under an enabled status, for example low voltage level 0V, so that the detection circuit 114 can detect when the first detecting terminal 111e of the first power connector 111 is connected or disconnected with the predetermined voltage terminal (such as ground) 132 through the second detecting terminal 121e and the detecting terminal 131e. Thereafter, the detection circuit 114 generates a power transmission status signal $V_a$ under an enabled status to the control unit 113 in response to the first detecting signal $V_{s1}$. Thereby, the control unit 113 determines the switch element $S_1$ is under an on status according to the power transmission status signal $V_a$ and further controls the operation of the power conversion circuit 112 to generate or output the output voltage $V_o$ to the data-processing equipment 10.

In an embodiment, when the remote control device 14 sends out a control signal to remote control the switch element $S_1$ to be turned off (as shown in FIG. 6B), the power supply 11 is under abnormal operation and does not generate or output the output voltage $V_o$ to the data-processing equipment 10. At the moment, the first detecting signal $V_{s1}$ is changed from an enabled status to a disabled status, for example changing from a lower voltage level 0V (i.e. the voltage level of the predetermined voltage terminal 132) to a higher voltage level 3.3V. Then, the detection circuit 114 generates a power transmission status signal $V_a$ under a disabled status to the control unit 113 in response to the first detecting signal $V_{s1}$. Thereby, the control unit 113 determines the switch element $S_1$ is under an off status according to the power transmission status signal $V_a$ and further controls the power conversion circuit 112 not to generate or output the output voltage $V_o$ to the data-processing equipment 10. Therefore, there is no electric current flowing between the contacts of the power connectors so that the generation of arc flash between the contacts of the power connectors will be prevented and the damages to the power supply or the data-processing system will be prevented; meanwhile, the objects of remote power management and distribution and power protection are also achieved.

To sum up, the present invention provides a power supply and a power supplying system used for a data-processing system and having power protection mechanism and remote power management function for preventing the generation of arc flash due to electric current flowing through the contacts of the connectors, avoiding damages to the power supply or the data-processing equipments due to the electric arc and unintentional or accidental interruption of power-supplying, and achieving the objects of remote power management and distribution and power protection.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply for providing an output voltage to one or more computing devices comprising:
    a power conversion circuit for converting an input voltage to an output voltage;
    a first connector having a first plurality of power terminals and a first detecting terminal, the input voltage being supplied to the power conversion circuit via the first plurality of power terminals;
    a second connector having a second plurality of power terminals and a second detecting terminal, wherein, when the first and second connectors are interconnected, each power terminal of the first plurality of power terminals is interconnected with a corresponding power terminal of the second plurality of power terminals and the first detecting terminal is interconnected with the second detecting terminal, and
    wherein the first and second detecting terminals are positioned such that when disconnecting the first connector from the second connector, the interconnection between the first and second detecting terminals is disconnected before the interconnections between the first and second plurality of power terminals are disconnected, the second plurality of power terminals providing the input voltage to the first plurality of power terminals; and
    a control unit having an input for receiving an input signal, the control unit further outputting a control signal for controlling the operation of the power conversion circuit based on the input signal, wherein when the input signal has a first value, the control signal causes the power conversion circuit to output the output voltage, and when the input signal has a second value, the control signal causes the power conversion circuit to cease outputting the output voltage even when the input voltage is supplied to the power conversion circuit; wherein the input signal has the first value when the first and second detecting terminals are interconnected,
    whereas the input signal has the second value when the first and second detecting terminals are disconnected such that, when disconnecting the first and second connectors, the disconnection of the first and second detecting terminals causes the input signal to be the second value prior to the disconnection of the first and second plurality of power terminals thereby causing the power conversion circuit to cease outputting the output voltage before the first and second plurality of power terminals are disconnected.

2. The power supply of claim 1, wherein the second detecting terminal is connected to ground such that the first value of the input signal is ground.

3. The power supply of claim 2, wherein the input of the control unit is connected to a voltage source via one or more resistors such that when the second detecting terminal is disconnected from ground, the input signal has the second value which is based on a voltage of the voltage source.

4. The power supply of claim 1, wherein the first plurality of power terminals comprises three power terminals, and wherein a first of the first plurality of power terminals receives a load voltage component of the input voltage, a second of the first plurality of power terminals receives a neutral component of the input voltage, and a third of the first plurality of power terminals is connected to ground.

5. The power supply of claim 1, further comprising: a third connector having a third plurality of power terminals for providing the output voltage to a device via a fourth connector.

6. The power supply of claim 5, wherein the third connector includes a third detecting pin and the fourth connector includes a fourth detecting pin, wherein the input signal has the first value when the first and second detecting terminals are interconnected and the third and fourth detecting pins are interconnected, and wherein the input signal has the second value when either the first and second detecting terminals are disconnected or the third and fourth detecting pins are disconnected.

7. The power supply of claim 6, wherein when the third connector is disconnected from the fourth connector, the third detecting pin disconnects from the fourth detecting pin prior to the third plurality of power terminals disconnecting from a corresponding plurality of power terminals of the fourth connector.

8. The power supply of claim 7, further comprising a component that generates the input signal by implementing a logical OR of a first OR input and a second OR input, the first OR input having the first value when the first and second detecting terminals are interconnected and the second OR input having the first value when the third and fourth detecting pins are interconnected such that the component generates the input signal having the second value when either or both the first and second detecting terminals or the third and fourth detecting pins are disconnected.

9. The power supply of claim 7, wherein the first and second detecting terminals and the third and fourth detecting pins are connected in series.

10. The power supply of claim 9, wherein the fourth detecting pin is connected to the first detecting terminal via a first connection pin of the third connector and a second connection pin of the fourth connector.

11. The power supply of claim 10, wherein third detecting pin is connected to a voltage source via one or more resistors, the voltage source causing the input signal to have the second value when the third detecting pin is disconnected from ground.

12. The power supply of claim 1, further comprising: a switch which when open causes the input signal to have the second value.

13. The power supply of claim 12, further comprising: a remote control device for receiving a command from a remote location and for causing the switch to be opened in response to the command.

14. The power supply of claim 13, wherein the switch is connected between ground and the second detecting terminal.

15. The power supply of claim 13, wherein the command is received via a wireless or wired communication medium.

16. The power supply of claim 9, further comprising: a switch which when open causes the input signal to have the second value.

17. The power supply of claim 16, further comprising: a remote control device for receiving a command from a remote location and for causing the switch to be opened in response to the command.

18. The power supply of claim 1, wherein the second connector forms part of a power cable having another connector for connecting the power cable with a source of the input voltage.

19. A power supply for providing an output voltage to one or more computing devices comprising:
a power conversion circuit for converting an input voltage to an output voltage;
a first connector having a first plurality of power terminals and a first detecting terminal, the input voltage being supplied to the power conversion circuit via the first plurality of power terminals;
a second connector having a second plurality of power terminals and a second detecting terminal, wherein, when the first and second connectors are interconnected, each power terminal of the first plurality of power terminals is interconnected with a corresponding power terminal of the second plurality of power terminals and the first detecting terminal is interconnected with the second detecting terminal, and
wherein the first and second detecting terminals are positioned such that when disconnecting the first connector from the second connector, the interconnection between the first and second detecting terminals is disconnected before the interconnections between the first and second plurality of power terminals are disconnected, the second plurality of power terminals providing the input voltage to the first plurality of power terminals;
a control unit having an input for receiving an input signal, the control unit further outputting a control signal for controlling the operation of the power conversion circuit based on the input signal, wherein when the input signal has a first value, the control signal causes the power conversion circuit to output the output voltage, and when the input signal has a second value, the control signal causes the power conversion circuit to cease outputting the output voltage even when the input voltage is supplied to the power conversion circuit; and
a third connector having a third plurality of power terminals and a third detecting terminal, the third plurality of power terminals receiving the output voltage from the power conversion circuit, the third plurality of power terminals configured to interconnect with corresponding power terminals of a fourth connector and the third detecting terminal being configured to interconnect with a fourth detecting terminal of the fourth connector,
wherein the third connector is configured such that, when the third connector is disconnected from the fourth connector, the third detecting terminal disconnects from the fourth detecting terminal prior to the third plurality of power terminals disconnecting from the corresponding power terminals of the fourth connector;
wherein the input signal is configured to have the first value when the first and second detecting terminals are interconnected and the third detecting terminal is connected with the fourth detecting terminal,
whereas the input signal is configured to have the second value when the first and second detecting terminals are disconnected or when the third detecting terminal is disconnected from the fourth detecting terminal such that, when disconnecting the first and second connectors or when disconnecting the third connector from the fourth connector, the disconnection of the first detecting terminal from the second detecting terminals or the disconnection of the third detecting terminal from the fourth detecting terminal causes the input signal to be the second value prior to the disconnection of the first and second plurality of power terminals or the disconnection of the third plurality of power terminals from the corresponding power terminals of the fourth connector thereby causing the power conversion circuit to cease outputting the output voltage before the first and second plurality of power terminals are disconnected or before the third plurality of power terminals are disconnected from the fourth plurality of power terminals.

20. A power supply for providing an output voltage to one or more computing devices comprising:
a power conversion circuit for converting an input voltage to an output voltage;

a first connector having a first plurality of power terminals and a first detecting terminal, the input voltage being supplied to the power conversion circuit via the first plurality of power terminals;

a second connector having a second plurality of power terminals and a second detecting terminal, wherein, when the first and second connectors are interconnected, each power terminal of the first plurality of power terminals is interconnected with a corresponding power terminal of the second plurality of power terminals and the first detecting terminal is interconnected with the second detecting terminal, and wherein the first and second detecting terminals are positioned such that when disconnecting the first connector from the second connector, the interconnection between the first and second detecting terminals is disconnected before the interconnections between the first and second plurality of power terminals are disconnected, the second plurality of power terminals providing the input voltage to the first plurality of power terminals; and a control unit having an input for receiving an input signal, the control unit further outputting a control signal for controlling the operation of the power conversion circuit based on the input signal, wherein when the input signal has a first value, the control signal causes the power conversion circuit to output the output voltage, and when the input signal has a second value, the control signal causes the power conversion circuit to cease outputting the output voltage even when the input voltage is supplied to the power conversion circuit;

wherein the input signal has the first value when the first and second detecting terminals are interconnected, whereas the input signal has the second value when the first and second detecting terminals are disconnected such that the input signal is switched from the first value to the second value before the first plurality of power terminals are disconnected from the second plurality of power terminals.

* * * * *